(12) United States Patent
Aaltonen (10) Patent No.: US 10,365,105 B2
(45) Date of Patent: Jul. 30, 2019

(54) VIBRATORY GYROSCOPE

(71) Applicant: MURATA MANUFACTURING CO., LTD., Kyoto (JP)

(72) Inventor: Lasse Aaltonen, Espoo (FI)

(73) Assignee: MURATA MANUFACTURING CO., LTD., Kyoto (JP)

( * ) Notice: Subject to any disclaimer, the term of this patent is extended or adjusted under 35 U.S.C. 154(b) by 234 days.

(21) Appl. No.: 13/927,443

(22) Filed: Jun. 26, 2013

(65) Prior Publication Data

US 2014/0000365 A1     Jan. 2, 2014

(30) Foreign Application Priority Data

Jun. 29, 2012 (FI) .................................. 20125759

(51) Int. Cl.
    *G01C 19/5776*     (2012.01)
    *G01C 19/5762*     (2012.01)
    *G01C 19/5726*     (2012.01)

(52) U.S. Cl.
    CPC ..... *G01C 19/5776* (2013.01); *G01C 19/5726* (2013.01); *G01C 19/5762* (2013.01)

(58) Field of Classification Search
    CPC ................. G01C 19/5726; G01C 19/5762
    See application file for complete search history.

(56) References Cited

U.S. PATENT DOCUMENTS

| | | |
|---|---|---|
| 5,847,279 A | 12/1998 | Piazza |
| 2003/0066351 A1* | 4/2003 | Weinberg ........... G01C 19/5719 73/504.16 |
| 2005/0183502 A1* | 8/2005 | Rodney .............. G01C 19/5719 73/504.02 |
| 2007/0180908 A1 | 8/2007 | Seeger et al. |
| 2008/0000296 A1* | 1/2008 | Johnson ............. G01C 19/5719 73/514.18 |

(Continued)

FOREIGN PATENT DOCUMENTS

| | | |
|---|---|---|
| CN | 1802550 A | 7/2006 |
| CN | 101922934 A | 12/2010 |

(Continued)

OTHER PUBLICATIONS

International Search Report international application No. PCT/FI2013/050697 dated Nov. 14, 2013.

(Continued)

*Primary Examiner* — Son T Le
*Assistant Examiner* — Herbert K Roberts
(74) *Attorney, Agent, or Firm* — Squire Patton Boggs (US) LLP (57) ABSTRACT

An improved sensing device comprising micromechanical gyroscope and a feed-back loop with a controller for creating a damp control signal. A frequency generator generates a drive signal for drive mode vibration and a reference signal that is in quadrature-phase in relation to the drive mode vibration. The quadrature reference signal is summed with the damp control signal of the controller. The resulting transducer control signal is fed to the second mechanical resonator. Stable cancellation of the actual mechanical quadrature motion is achieved already at the sensing element level, before the detection of the Coriolis signal.

10 Claims, 5 Drawing Sheets

(56) References Cited

U.S. PATENT DOCUMENTS

| | | | |
|---|---|---|---|
| 2010/0307243 A1* | 12/2010 | Prandi | G01C 19/5726 73/504.12 |
| 2011/0192226 A1 | 8/2011 | Hayner et al. | |
| 2012/0192648 A1* | 8/2012 | Geen | G01C 19/5776 73/504.12 |

FOREIGN PATENT DOCUMENTS

| | | |
|---|---|---|
| CN | 102057249 A | 5/2011 |
| DE | 102010053022 A1 | 6/2012 |
| EP | 1 624 286 A1 | 2/2006 |
| EP | 1 873 489 A1 | 1/2008 |
| EP | 1 914 512 A2 | 4/2008 |
| JP | 2011047921 A | 3/2011 |
| TW | 200615538 A | 5/2006 |
| TW | 201102616 A | 1/2011 |

OTHER PUBLICATIONS

Finnish Search Report dated Apr. 30, 2013 corresponding to Finnish Patent Application No. 20125759.

Mikko Saukoski et al., "Zero-Rate Output and Quadrature Compensation in Vibratory MEMS Gyroscopes," IEEE Sensors Journal, Dec. 2007, vol. 7, No. 12, pp. 1639-1652.

Jian et al., "Force Rebalance Controller Synthesis for a Micromachined Vibratory Gyroscope Based on Sensitivity Margin Specifications," Journal of Microelectromechanical Systems, Dec. 2011, vol. 20, No. 6, pp. 1382-1394.

Erdinc et al., "Quadrature-Error Compensation and Corresponding Effects on the Performance of Fully Decoupled MEMS Gyroscopes," Journal of Microelectromechanical Systems, Jun. 2012, vol. 21, No. 3, pp. 656-667.

Maurer et al., "Quadrature Compensation for Gyroscopes in Electro-Mechanical Bandpass-Modulators beyond Full-Scale Limits using Pattern Recognition," Procedia Engineering, 2011, vol. 25, pp. 1589-1592.

European Patent Office, Supplementary European Search Report for corresponding Appln. No. 13 81 0666, dated Apr. 13, 2016.

Search Report dated Dec. 13, 2016 corresponding to Taiwanese Patent Application No. 102123159.

People's Republic of China Search Report issued in corresponding Chinese Patent Application No. 201380031158.9 dated Apr. 14, 2017.

* cited by examiner

VIBRATORY GYROSCOPE

FIELD OF THE INVENTION

The present invention relates to microelectromechanical devices and especially to a sensor device and a method for sensing angular velocity, as defined in the preambles of the independent claims.

BACKGROUND OF THE INVENTION

Micro-Electro-Mechanical Systems, or MEMS can be defined as miniaturized mechanical and electro-mechanical systems where at least some elements have some mechanical functionality. Since MEMS devices are created with the same tools used to create integrated circuits, micromachines and microelectronics can be fabricated on the same piece of silicon to enable machines with intelligence.

MEMS structures can be applied to quickly and accurately detect very small changes in physical properties. For example, a microelectromechanical gyroscope can be applied to quickly and accurately detect very small angular displacements. Motion has six degrees of freedom: translations in three orthogonal directions and rotations around three orthogonal axes. The latter three may be measured by an angular rate sensor, also known as a gyroscope. MEMS gyroscopes use the Coriolis Effect to measure the angular rate. When a mass is moving in one direction and rotational angular velocity is applied, the mass experiences a force in orthogonal direction as a result of the Coriolis force. The resulting physical displacement caused by the Coriolis force may then be read from a capacitively or piezoresistively sensing structure.

In MEMS gyros the primary motion cannot be continuous rotation as in conventional ones due to a lack of adequate bearings. Instead, mechanical oscillation may be used as the primary motion. When an oscillating gyroscope is subjected to an angular motion orthogonal to the direction of the primary motion, an undulating Coriolis force results. This creates a secondary oscillation orthogonal to the primary motion and to the axis of the angular motion, and at the frequency of the primary oscillation. The amplitude of this coupled oscillation can be used as the measure of the angular rate.

The challenges in MEMS gyroscopes are related to the fact that the magnitude of the sense-mode response amplitude is extremely small. In implementations, fabrication imperfections result in non-ideal geometries in the gyroscope structure and cause the drive oscillation to partially couple into the sense mode. Understanding the relative magnitudes of the drive and sense mode oscillations, even smallest undesired couplings from the primary oscillation could exceed the sensed Coriolis response. The Coriolis force is, however, proportional to the drive velocity of the mass and the coupled force to the position of the mass, so there is always a $\pi/2$ phase difference between the Coriolis response and the mechanical force. The quadrature signal can therefore be relatively easily separated from the Coriolis signal during amplitude demodulation at the drive frequency. However, existing configurations tend to increase the size and complexity of the sensing device configurations. A further implication of the large relative magnitude of the quadrature signal is that the stability of quadrature over temperature and over time is important. If the part of the quadrature signal that mixes into the rate signal varies significantly, the stability of the gyroscope deteriorates.

BRIEF DESCRIPTION OF THE INVENTION

The object of the present invention is to enable stable cancellation of the actual mechanical quadrature motion already at the sensing element level, before the detection of the Coriolis signal. The objects of the present invention are achieved with a sensor device and a method according to the characterizing portions of the independent claims. The preferred embodiments of the invention are disclosed in the dependent claims.

The present invention is based on summing a signal generated for cancellation of the quadrature signal to a control signal of a closed feed-back loop for damping resonance effects. Further advantages of the invention are discussed in more detail with embodiments of the invention.

BRIEF DESCRIPTION OF THE FIGURES

In the following, the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of sensor devices and methods that are generally known to a person skilled in the art may not be specifically described herein.

Figure 1:
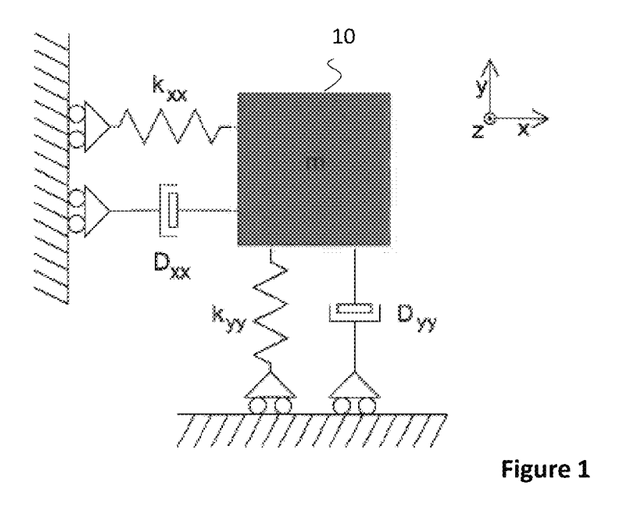
FIG. 1 shows a diagram of a 2-degree-of-freedom (DoF) mechanical resonator.

To establish the applied concepts and terms, FIG. 1 shows a diagram of a prior art 2-degree-of-freedom (DoF) mechanical resonator, as depicted in prior art (for example: "System and circuit design for a capacitive MEMS gyroscope" of Mikko Saukoski). The 2-DoF structure of FIG. 1 comprises two 1-DoF resonators, one formed by a mass 10, a spring $k_{xx}$ and a damper $D_{xx}$ in the direction of the x-axis, and the other formed by the mass 10, a spring $k_{yy}$ and a damper $D_{yy}$ in the direction of the y-axis. In a micromechanical sensor of angular velocity the x-directional resonator may be called a primary resonator or the drive resonator. It is typically excited with an external force at its resonance frequency, called the operating frequency. The y-directional resonator may be called a secondary resonator or the sense resonator. When an angular velocity is applied about the z-axis, a corresponding Coriolis force may be detected in the secondary resonator. In the function diagram of FIG. 1 the masses of the primary and the secondary resonators are identical. Depending on the configuration, the masses of the primary resonator and the secondary resonator may also be different.

Figure 2:
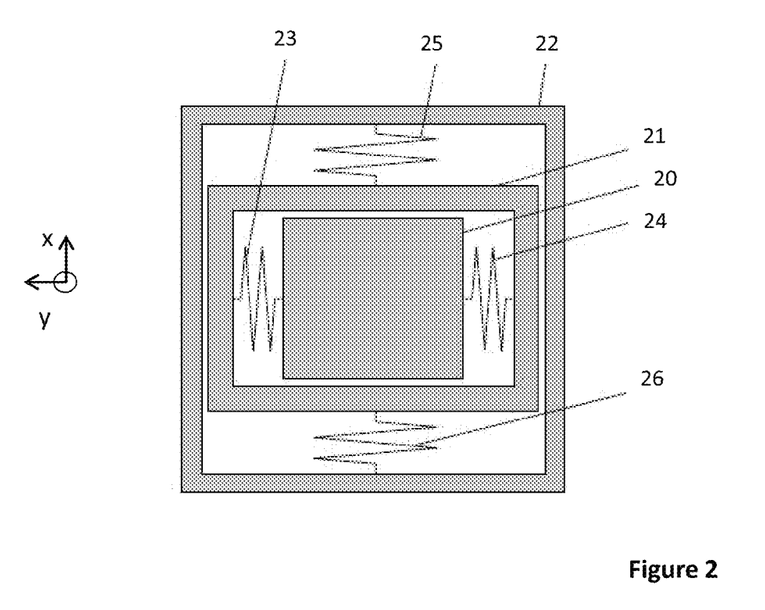
FIG. 2 illustrates configuration of an exemplary micromechanical gyroscope.

FIG. 2 illustrates configuration of another exemplary micromechanical gyroscope that comprises a mass 20, supported at an activation frame 21 in the direction of the y-axis by means of springs 23, 24. Said activation frame 21 is further supported at a support structure 22 in the direction of the x-axis by means of springs 25, 26. In the illustrated gyroscope, the mass 20 in the middle, and the activation frame 21 surrounding it, may be activated into a vibratory primary motion in the direction of the x-axis, enabled by the springs 25, 26. The detection axis formed in the direction of the y-axis by means of the spring suspension 23, 24 of the mass 20 to the activation frame 21, is perpendicular to the primary motion.

When the structure that vibrates in the primary motion is rotated in relation to the Z-axis perpendicular to the surface xy-plane, the mass 20 in primary motion experiences a Coriolis force in the direction of the y-axis. The detection springs 23, 24, in addition to defining the damping, further define the amplitude and phase of the vibration of the induced detection motion.

Figure 3:
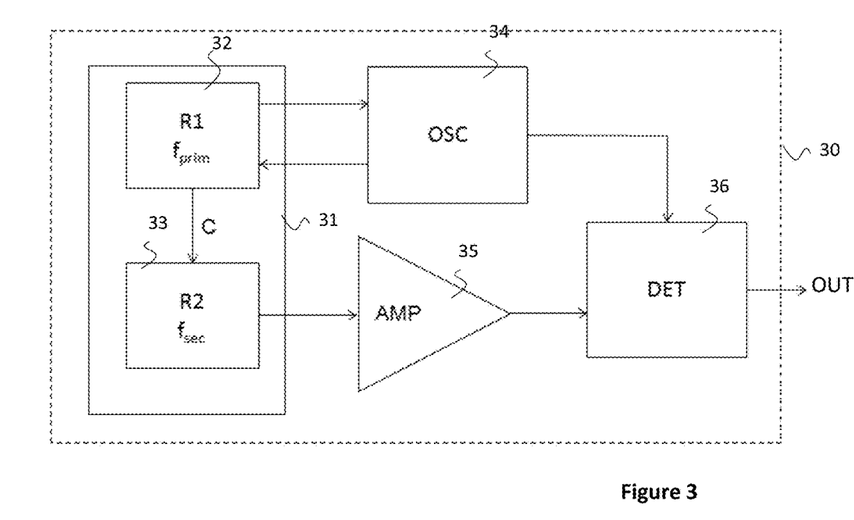
FIG. 3 illustrates configuration of an exemplary microelectromechanical sensor device.

FIG. 3 illustrates configuration of an exemplary prior art microelectromechanical sensing device 30. The device comprises a micromechanical gyroscope 31 that comprises a first mechanical resonator 32 for drive mode vibration (primary motion), and a second mechanical resonator 33 that is coupled to the first mechanical resonator to produce associated sense mode vibration (secondary motion) in a direction that is perpendicular to the direction of the drive mode vibration. Drive mode vibration may be implemented and controlled, for example, with a primary oscillator circuit 34 that generates an oscillating electrical signal and a transducer (not shown) that converts the voltage mode input to the first mechanical resonator into electrostatic drive force in the primary resonator. Advantageously, the drive mode vibration is adjusted to occur in the resonant frequency of the primary resonator 32.

The coupling between the modes of the first mechanical resonator 32 and the second mechanical resonator 33 causes a sense mode vibration in the second mechanical resonator 33. Vibration of the second mechanical resonator 33 may be converted into an electrical signal with a transducer (not shown). The electrical signals output from the secondary resonator correspond to the sense mode vibration, and they may be amplified with an amplifier 35. The configuration of the exemplary micromechanical sensor device of FIG. 3 applies synchronous detection so that electrical signals from the primary oscillator circuit as well as from the amplifier are fed into a synchronous detector 36 that generates the output of the sensor device. When a rotational force is acted upon the micromechanical sensor device, the drive mode vibration of the gyroscope couples with the sense mode vibration via Coriolis force, and the electrical signal received from the second mechanical resonator corresponds to Coriolis force and thus to angular velocity of the device.

Figure 4:
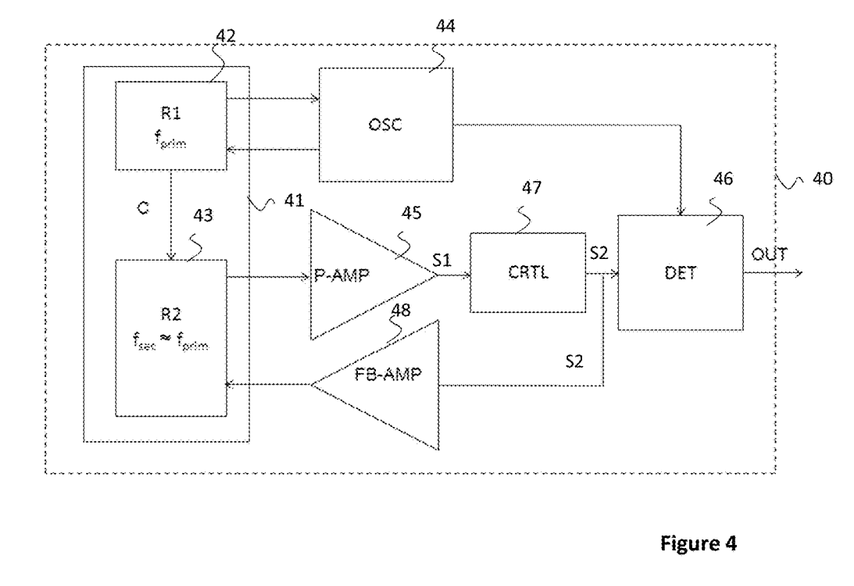
FIG. 4 shows a block diagram that illustrates an embodiment of a micromechanical sensing device configuration.

FIG. 4 shows a block diagram of a micromechanical sensing device configuration by means of which improved sensitivity is achieved. Elements already described in connection with FIG. 3 are denoted with corresponding reference numbers. For a person skilled in the art it is clear that also other configuration for detecting and processing generated signals may be applied without deviating from the scope of protection. In addition to the configuration of FIG. 3, the micromechanical sensing device of FIG. 4 comprises a feed-back loop that is connected to the second mechanical resonator and is adjusted to damp the sense mode vibration of the second resonator. The signal S2 output from the feed-back loop is also the sensed signal input to the detector. For damping the feed-back loop comprises a transducer element (within the second resonator, not shown) and a controlling element 47. The feed-back loop may also comprise a feed-back amplifier 48 to amplify the feed-back signal to an appropriate level.

A transducer refers here to a device that converts one form of energy to another. For example, a sensor is a device or system that detects a physical property and converts it into a measurable signal. Typically the physical property manifests itself as one form of energy and is converted in the sensor to another form of energy with a transducer device. The physical property and the means for detecting the form of energy may vary according to the application. In one category of sensors, a characteristic representing a detected physical property may comprise detection of displacement of a reference point with respect of an inertial frame of reference. The displacement may be detected, for example, as movement of a suspended proofmass, or stress or strain exerted on a transducer element connected to the elastic suspension that carries the proofmass. The detected motion, stress or strain may be used to modulate electrical signals, which makes the physical property quite accurately measurable. As another example, in actuators, transducers may be used to convert electromagnetic energy into some form of motion, stress or strain.

A transducer in the present embodiment may be modeled with a mass-spring system where the mass is suspended on the spring to a body in such a manner that a force exerted to the mass, or acceleration of the body causes a proportional displacement to the mass. By means of electric circuitry, movement of the mass may be detected and transformed into a measurable electrical signal. A mass-spring system is in an equilibrium state when the body is static and no net force acts on the mass. If the system is displaced from the equilibrium, the spring causes a net restoring force on the mass, tending to bring it back to equilibrium. However, in moving back to the equilibrium position, the mass acquires a momentum which keeps it moving beyond that position, establishing a new restoring force in the opposite sense. Hence, the mass begins to oscillate about the equilibrium state. The mass may be biased and its movement in respect of static electrodes then converted to an electrical signal. The harmonic oscillations of the mass thus transform into alternating electrical signals that represent movement of the body with respect to an inertial frame of reference.

Figure 5:
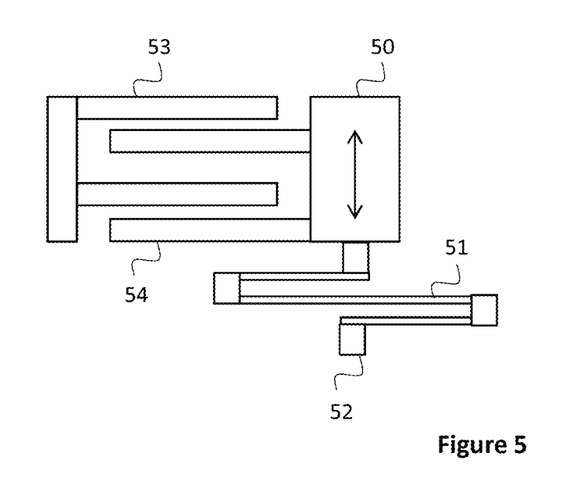
FIG. 5 shows a simplified example of a mass-spring system applicable for transducing displacements into electrical signals.
Figure 6:
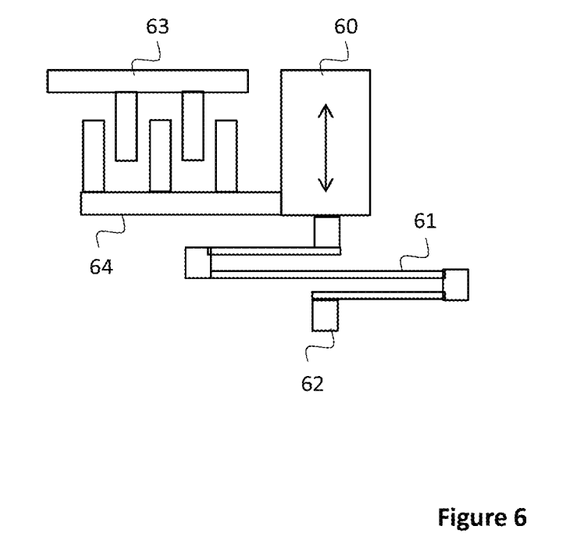
FIG. 6 shows another example of a mass-spring system applicable for transducing displacements into electrical signals.

FIG. 5 shows a simplified example of a mass-spring system applicable for transducing displacements into electrical signals. The second resonator is represented now with a 1-DoF system that has a proofmass 50 and a spring element 51 coupled to the primary resonator (not shown). The system may have one or more stationary electrodes 53 and one or more movable electrodes 54 connected to the motion of the proofmass 50. The transducer for measuring the displacement in FIG. 5 is based on a capacitive effect, wherein capacitance between electrodes 53 and 54 changes when the distance between them changes. This change in capacitance may be used to modulate an electrical signal output from the transducer. FIG. 6 shows another type of capacitive transducer; same reference numerals are used to refer to corresponding elements in FIGS. 5 and 6. In the transducer of FIG. 6, modulation of the electrical signal corresponds to change in the overlapping areas of the electrodes 63 and 64. The transducers in FIGS. 5 and 6 measure displacement of a proof element based on a capacitive effect, but other types of transducers that transform a detected indication of a physical property to an electrical signal may also be applied. Transducers may indicate, for example, strain or stress exerted on the proof element, and other types of effects, like piezoelectric, and electromagnetic.

Figure 7:
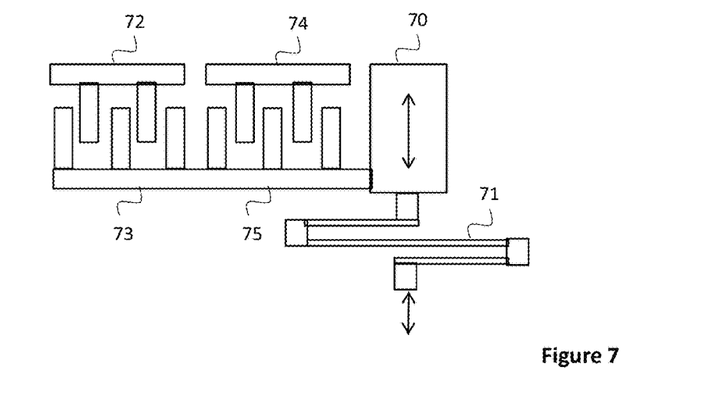
FIG. 7 shows a block diagram illustrating functional configuration of the exemplary second mechanical resonator.

In active electrical damping, a displacement generates in the first transducer an electrical signal, which is converted in the feed-back loop into a modified signal that controls the mechanical force to be exerted against the displacement to eliminate or at least reduce the detected movement. FIG. 7 shows a block diagram illustrating functional configuration in the exemplary second mechanical resonator 43 of FIG. 4.

The mechanical resonator of FIG. 7 comprises a proofmass 70, coupled via a spring element 71 to the first mechanical resonator (not shown). The system has one or more stationary TR1 electrodes 72 and one or more movable TR1 electrodes 73 connected to the motion of the proofmass 70. These electrodes 72, 73 form a capacitive displacement measuring transducer. The system has also one or more stationary TR2 electrodes 74 and one or more movable TR2 electrodes 75 connected to the motion of the proofmass 70. These electrodes 74, 75 form a force generating electrostatic transducer.

It is noted that FIG. 7 illustrates a transducer element based on capacitive and electrostatic effects, it is clear to everyone skilled in the art that the transducers TR1 and TR2 of FIG. 4 may be based on any known biased transducer principle. For example, the first transducer may be configured to detect displacement by means of motion, stress or strain based on capacitive effect, piezoelectric effect, electromagnetic effect or piezoresistive effect. The second transducer may be configured to induce displacement by means of force, torque, stress or strain based on electrostatic effect, piezoelectric effect, electromagnetic effect, thermoelastic effect, electrostriction or magnetostriction.

A displacement of a proofmass in the second mechanical resonator 43 may be measured electrically with TR1 electrodes (cf. 72, 73 in FIG. 7) of R2 and converted to an electrical signal. The electrical signal may be amplified by a pre-amplifier 45, and the amplified signal S1 fed via a controller 47 back to the forcing transducer TR2. TR2 electrodes (cf. 74, 75 in FIG. 7) of R2 will exert a force to the proofmass. Exerted force thus corresponds to the second electrical signal S2. S2 may be fed to TR2 with such a phase relation to the detected displacement S1 that movement of the proofmass is reduced by the applied force.

In order to achieve appropriate transfer function, efficient reduction of element Q-value by means of the feed-back loop is necessary. Conventionally higher damping has been achieved by increasing the amplification of signal S2 in the feed-back loop, i.e. so called loop gain that includes contributions from any amplifiers in the loop, the controller, the transducers, the frequency response of the mechanical resonator and the spring constant of the resonator spring element. However, while doing so, one has to take care that the closed loop transfer function remains stable at all conditions. With conventional controllers, when higher values of amplification are attempted, practical systems easily start to oscillate at a frequency that is considerably higher than the fundamental resonant frequency of the resonator.

Strong damping, i.e. sufficiently reduced mechanical motion of the element that operates in closed-loop Q-value levels may be achieved, for example, with a configuration where the controller 47 that controls the feed-back force against the detected motion is a signal processing filter. Advantageously, the signal processing filter functions as a resonator, and therefore peaks at a defined resonant frequency. Accordingly, the response function that defines correspondence between values of S1 and S2 is a frequency response function that has a resonant frequency characteristic that essentially coincides with the resonant frequency of S1. Such configuration is described in more detail in the Applicant's co-pending application "An improved mechanical resonator", FI20125757, which is incorporated herein by reference.

Figure 8:
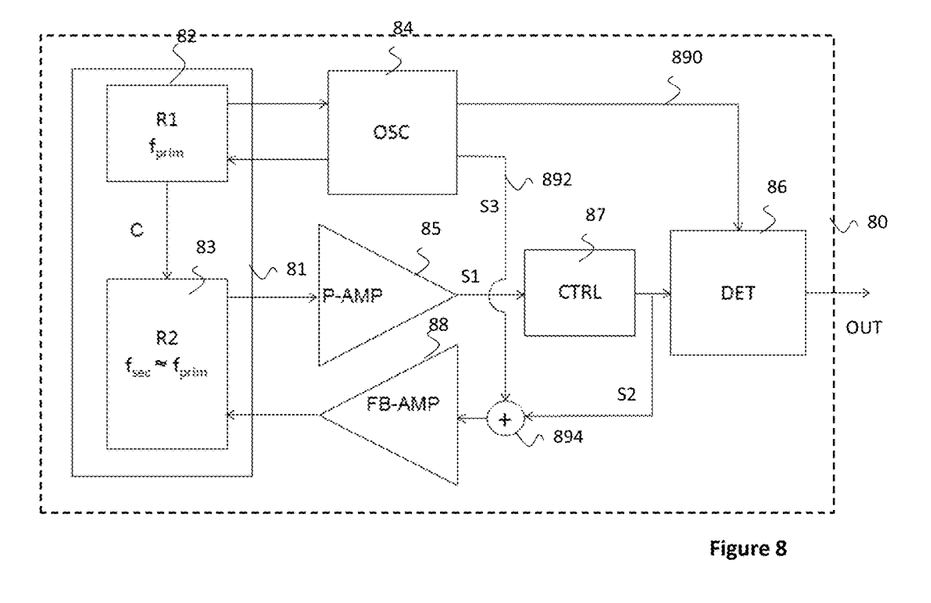
FIG. 8 shows a block diagram of an improved micromechanical sensing device configuration.

As discussed above, the quadrature signal has a major effect on the zero point stability of a gyroscope of a sensing device. It is therefore desirable to adjust the quadrature signal to a lowest possible level before the synchronous detection of the Coriolis signal. FIG. 8 shows a block diagram of a micromechanical sensing device configuration, by means of which the quadrature signal may be effectively managed with a small number of extra circuit elements. Elements already described in connection with FIG. 4 are denoted with corresponding reference numbers.

In the present configuration, the primary frequency generator 84 is configured to generate in the known manner a first reference signal 890 for synchronous detection of the Coriolis signal. The first reference signal is in the same phase with the sensed Coriolis signal. In addition to this, the primary frequency generator 84 of FIG. 8 may be configured to generate a feed-forward quadrature phase compensation signal S3 892 that is fed to a weighted summing element 894. The phase compensation signal S3 may be made readily accessible within the primary frequency generator 84 by means of an oscillator or primary loop design, in a manner well known to a person skilled in the art. The summing element 894 sums S3 with the feed-back signal S2 of the controller 87 of the damping feed-back loop and feeds the result to the feed-back amplifier 88. The force generated by the summed feed-back signal will now at the same time cancel the quadrature signal and cause damping as controlled by the controller 87, and the desired effect is achieved with minimal additional electrical and/or mechanical elements. The weight coefficient of the quadrature compensation signal S3 in the summing element 894 may be adjusted when the gyroscope of the sensing device is trimmed in manufacturing before taken into use. Trimming can be accomplished by setting the quadrature content of signal S2 to zero by controlling the summing element 894.

Figure 9:
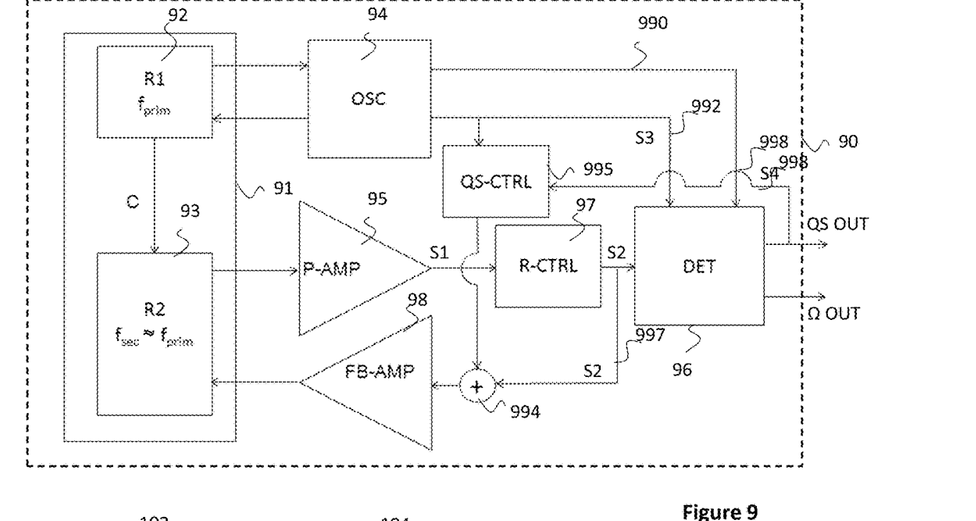
FIG. 9 shows a block diagram of a further configuration for a micromechanical sensing device.

In a further embodiment, the compensation may be made dynamically adaptable, again with very few additional circuit elements. FIG. 9 shows a block diagram of a micromechanical sensing device configuration, by means of which the quadrature signal may be dynamically managed. Elements already described in connection with FIG. 8 are denoted with corresponding reference numbers. In addition to them, the present configuration comprises a quadrature signal amplitude controller 995 that provides an adjustable gain stage through which the quadrature phase compensation signal 992 may be fed to the summing element 994. The detection unit 96 may comprise a first synchronous detector for synchronous detection with the In-phase signal 990, and a second synchronous detector for synchronous detection with the quadrature signal 992. The detected quadrature signal S4 level 998 may be fed to the gain control amplifier 995. By means of this, the compensation signal may be adjusted to such a level that adaptive cancellation of the quadrature signal is realized.

In a capacitive gyroscope DC bias voltage may be used for capacitive motion detection and electrostatic force generation for excitation. The output voltage of a front end amplifier follows the equation $$V_{OUT} = \frac{C_S}{C_{REF}} V_{BIAS} \quad (1)$$

where $C_S$ is the sensor capacitance, $C_{REF}$ is he reference capacitor and $V_{BIAS}$ is the applied DC bias voltage. In a conventional capacitive gyroscope the rate signal output is typically proportional to the bias voltage. This is desirable when an AD converter stage has the same bias voltage as a reference voltage and thus in the digital signal bias voltage instabilities are cancelled.

In a force feed-back damped gyro the rate output voltage is inversely proportional to the bias voltage. The output voltage is now $$V_{OUT} \propto \frac{F_{SIGNAL}}{V_{BIAS}} \quad (2)$$

After AD conversion the digital signal will be inversely proportional to the square of the bias voltage. This sets very strict requirements to the stability of the bias voltage.

Figure 10:
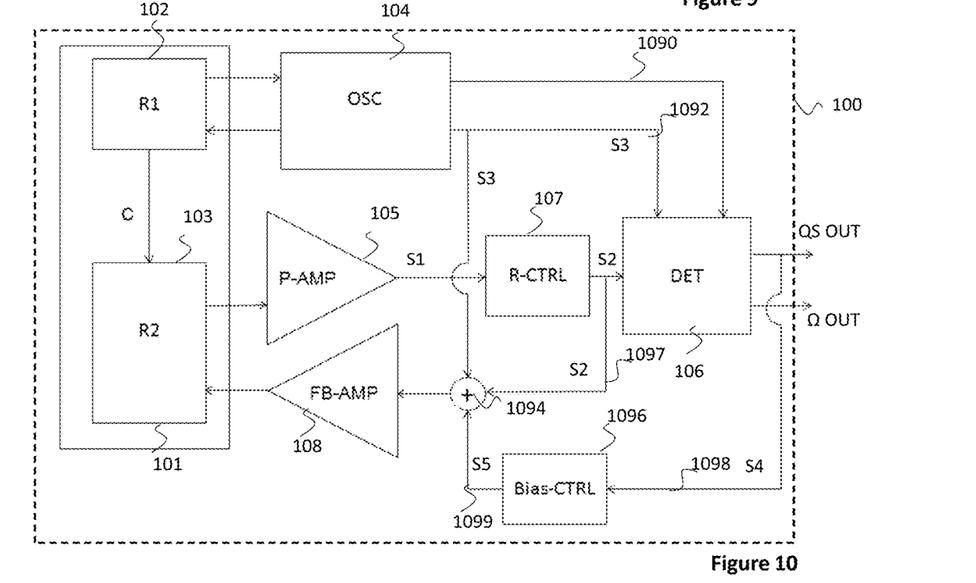
FIG. 10 shows a block diagram of a further configuration for a micromechanical sensing device.

FIG. 10 shows a block diagram of a further micromechanical sensing device configuration, by means of which the quadrature signal may be dynamically managed in a manner that efficiently compensates variations in the bias voltage. Elements already described in connection with FIGS. 8 and 9 are denoted with corresponding reference numbers. As discussed with FIG. 8, a feed-forward quadrature phase compensation signal S3 892 may be fed to a weighted summing element 894 to be summed with the feed-back signal S2 of the controller 87. S3 may have signal phase similar to that of R1 proof mass position. In addition to them, the present configuration comprises a DC bias controller 1096 for dynamic compensation of temporary or environmental effects causing variations to the bias voltage. The detected quadrature signal S4 level may be fed to the direct current bias controller 1096, which may be configured to adjust the bias voltage signal S5 to such a level that adaptive cancellation of the quadrature signal is attained, as described with FIG. 10. This method effectively renders the bias dependency of the output signal to be similar to equation (1), which is highly desirable when an AD-converter is used.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A sensing device comprising a micromechanical gyroscope, the gyroscope comprising:
   a first mechanical resonator for drive mode vibration;
   a second mechanical resonator coupled to the first mechanical resonator for sense mode vibration corresponding to Coriolis force resulting from rotation of the sensing device;
   a drive frequency generator configured to output a drive signal for the drive mode vibration; and
   a sense feed-back loop configured to dampen the sense mode vibration, wherein
   the drive frequency generator is configured to also generate a quadrature reference signal that is in quadrature-phase to the Coriolis force and output the quadrature reference signal to the sense feed-back loop,
   the sense feed-back loop comprises a sense feedback controller and an electromechanical transducer in the second mechanical resonator,
   the electromechanical transducer of the second mechanical resonator is configured to oppose the sense mode vibrations of the second mechanical resonator according to an input control signal,
   the sense feedback controller is configured to input a sense signal representing a sense mode vibration, and to output a sense feed-back signal for opposing the sense mode vibration of the second mechanical resonator, and
   the feed-back loop includes a summing element configured to receive from the drive frequency generator the quadrature reference signal, to receive from the sense feed-back controller the sense feed-back signal, and to sum the quadrature reference signal with the sense feed-back signal,
   wherein the summing element is configured to generate the input control signal to the transducer of the second mechanical resonator from the sum of the quadrature reference signal and the sense feed-back signal,
   wherein the summing element is a weighted summing element, and
   wherein the sensing device further comprises a detection unit and a bias controller;
   the detection unit is configured to input a sensed signal and the reference signal;
   the detection unit is configured to generate a detected quadrature signal from the sensed signal and the reference signal; and
   the bias controller is configured to input the detected quadrature signal and input to the summing element a bias control signal corresponding to the detected quadrature signal.

2. A sensing device according to claim 1, wherein weights of the summed signals have been adjusted during manufacturing of the sensing device.

3. A sensing device according to claim 1, wherein the sensing device further comprises a detection unit and a quadrature signal amplitude controller;
   the detection unit is configured to input a sensed signal, and the reference signal;
   the detection unit is configured to generate a detected quadrature signal from the sensed signal and the reference signal;

the quadrature signal amplitude controller is configured to apply the detected quadrature signal to control the level of the reference signal before feeding it to the summing element.

4. A sensing device according to claim 1, wherein a response function of the controller is a frequency response function that has a resonant frequency characteristic that essentially coincides with a resonant frequency of the second mechanical resonator.

5. A sensing device according to claim 1, wherein the controller has a signal processing filter.

6. A sensing device according to claim 5, wherein a quality factor of the signal processing filter is above 1.

7. A sensing device according to claim 5, wherein a quality factor of the signal processing filter is in the range 3 to 10.

8. A method for sensing rotation of a sensing device comprising a micromechanical gyroscope with a first mechanical resonator for drive mode vibration, a second mechanical resonator coupled to the first mechanical resonator for sense mode vibration corresponding to Coriolis force resulting from rotation of the sensor device, a drive frequency generator configured to output a drive signal for the drive mode vibration, and a sense feed-back loop comprising a sense feedback controller configured to dampen the sense mode vibration, wherein the method comprises:
   generating a quadrature reference signal that is in quadrature-phase to the Coriolis force and output the quadrature reference signal to the sense feed-back loop;
   creating a feed-back signal in a feed-back loop comprising a controller and an electromechanical transducer in the second mechanical resonator, wherein the electromechanical transducer of the second mechanical resonator is configured to oppose sense mode vibrations of the second mechanical resonator according to an input control signal;
   inputting a sense signal representing a sense mode vibration, and outputting a sense feed-back signal for opposing the sense mode vibration of the second mechanical resonator;
   receiving in a summing element from the drive frequency generator the quadrature reference signal;
   receiving in the summing element from the sense feed-back controller the sense feed-back signal;
   summing in the summing element the received quadrature reference signal with the sense feed-back signal; and
   creating the input signal to the transducer of the second mechanical resonator from the sum of the quadrature reference signal and the sense feed-back signal,
   wherein the summing element is a weighted summing element, and
   wherein the sensing device further comprises a detection unit and a bias controller;
   the detection unit is configured to input a sensed signal and the reference signal;
   the detection unit is configured to generate a detected quadrature signal from the sensed signal and the reference signal; and
   the bias controller is configured to input the detected quadrature signal and input to the summing element a bias control signal corresponding to the detected quadrature signal.

9. A method according to claim 8, wherein the sensing device further comprises a detection unit and a quadrature signal amplitude controller; the method comprising
   feeding a sensed signal, and the reference signal to the detection unit;
   generating from the sensed signal and the reference signal in the detection unit a detected quadrature signal;
   using the detected quadrature signal in the quadrature signal amplitude controller to control the level of the reference signal before feeding it to the summing element.

10. A method according to claim 8, wherein the sensing device further comprises a detection unit and a bias controller; the method comprising:
   feeding a sensed signal, and the reference signal to the detection unit;
   generating from the sensed signal and the reference signal in the detection unit a detected quadrature signal;
   using the detected quadrature signal in the bias controller to create a bias voltage control signal corresponding to the detected quadrature signal;
   summing the quadrature reference signal, the bias voltage control signal and the output signal of the controller to create an input signal for the transducer of the second mechanical resonator.

* * * * *